United States Patent [19] [11] 3,801,272
Wagner et al. [45] Apr. 2, 1974

[54] WOOL TREATING PROCESS
[75] Inventors: George M. Wagner, Lewiston; William J. Vullo, Burnt Hills, both of N.Y.
[73] Assignee: Hooker Chemical Corporation, Niagra Falls, N.Y.
[22] Filed: Feb. 11, 1971
[21] Appl. No.: 114,716

Related U.S. Application Data
[63] Continuation-in-part of Ser. No. 619,066, Feb. 27, 1967, abandoned.

[52] U.S. Cl............... 8/127.6, 8/127.5, 8/128 R, 8/128 A, 8/DIG. 11, 117/141, 117/DIG. 7, 8/115.7, 260/33.8, 260/77.5
[51] Int. Cl.............. D06m 13/42, D06m 15/52
[58] Field of Search .. 8/127.5, 127.6, 128, DIG. 11; 117/146, DIG. 7

[56] References Cited
UNITED STATES PATENTS
3,261,655   7/1966   Neher .................. 8/127.6
3,498,740   3/1970   Cain .................... 8/127.6
3,552,910   1/1971   Wagner et al. ........ 8/127.6

FOREIGN PATENTS OR APPLICATIONS
638,671   3/1964   Belgium ................ 8/127.6

Primary Examiner—George F. Lesmes
Assistant Examiner—J. Cannon
Attorney, Agent, or Firm—Peter F. Casella; Richard P. Mueller

[57] ABSTRACT

A process for teating wool and other proteinaceous material to render it shrinkproof which comprises treating the proteinaceous material with a polymerizable treating solution which comprises a urethane-polyisocyanate composition containing $(OH)_n$, $(NCO)_p$ and

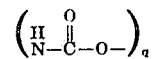

groups, wherein $n$ is a number from 0 to 4.5, $p$ is a number from 1.5 to 6 and $n + p$ is 3 to 6, and $q$ is from 1 to 20, wherein the said composition contains tertiary nitrogen, to the extent of at least 0.05 percent by weight and, thereafter, curing the thus-treated proteinaceous material with water.

10 Claims, No Drawings

WOOL TREATING PROCESS

This is a continuation-in-part of co-pending application Ser. No. 619,066, filed Feb. 26, 1967 and now abandoned.

This invention relates to an improved process for treating wool and more particularly it relates to an improved process for treating wool and similar proteinaceous materials so as to render such materials substantially shrinkproof.

In the past, a great deal of effort has been expended in attempts to develop compositions and processes for treating wool and similar proteinaceous materials so as to render such materials resistant to shrinking during washing. This has been particularly true in recent years with the advent of various so-called synthetic wools, such as the polyester fibers, polyamide, or polyacrylic fibers, and the like, which materials may be laundered repeatedly without encountering a problem of shrinking.

In a co-pending application, Ser. No. 510,102, filed Nov. 26, 1965, there is disclosed a composition and process for shrinkproofing wool which overcomes many of the problems of prior art treatments, in that it is easy to apply, has good durability and does not adversely affect the hand or feel of the fabrics which are treated. In this process, the proteinaceous material is treated with a polymerizable treating solution containing a polyhydroxy-modified isocyanate composition which contains $(OH)_n$, $(NCO)_p$ and

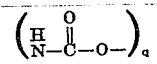

groups, wherein $n$ is a number from 0 to 4.5, $p$ is a number from 1.5 to 6, $q$ is a number from 1 to 20 and $n + p$ is 3 to 6, and, thereafter, curing the thus-treated material with water. In using this process, however, it has been found that where the proteinaceous material treated with the polymerizable polyhydroxy modified isocyanate composition contains wrinkles, the water curing of this fabric tends to set the wrinkles in the fabric, thus making them very difficult to remove. Additionally, although the hand or feel of the fabrics treated with these compositions are greatly superior to that of fabrics treated by the prior art process, it has been found that a relatively close control on the amount of the polymerizable composition deposited on the fabric is necessary in order to maintain this improved hand or feel.

It is, therefore, an object of the present invention to provide an improved process for the treatment of wool and similar proteinaceous materials to render such materials shrinkproof which process does not result in the setting of wrinkles in the fabric during the curing step.

Another object of the invention is to provide an improved process for treating wool to render it shrinkproof, which process provides for an accelerated initial cure by means of the moisture contained in the wool and in the surrounding atmosphere, followed by a final cure in water.

A further object of the present invention is to provide an improved process for treating proteinaceous materials to render them shrinkproof, which process does not require extremely close control of the amount of the treating composition added to the fabric in order to obtain a suitable hand.

These and other objects will become apparent to those skilled in the art from the description of the invention which follows.

Pursuant to the above objects, the present invention includes a process for treating a proteinaceous material which comprises contacting the proteinaceous material with a polymerizable treating solution comprising a urethane-polyisocyanate composition containing $(OH)_n$, $(NCO)_p$ and

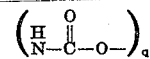

groups, wherein $n$ is a number from 0 to 4.5, $p$ is a number from 1.5 to 6, $q$ is a number from 1–20, and $n + p$ is 3 to 6, wherein the composition contains tertiary nitrogen in an amount of at least 0.05 percent by weight, and thereafter, curing the thus-treated proteinaceous material with water. Preferably, the urethane-polyisocyanate composition in the polymerizable treating solution is the reaction product of a polyhydroxy compound containing $m$ hydroxyl groups, and a diisocyanate, wherein from 1 percent to 100 percent by weight of the polyhydroxy compound is a tertiary nitrogenous polyhydroxy compound, the reactants being in the ratio of about 1 mole of the polyhydroxy compound to $m - n$ moles of the diisocyanate, wherein $m$ is a number from 3 to 6 and $n$, as has been defined hereinabove, is a number from 0 to 4.5 and $m - n$ is at least 1.5 and the tertiary N content is about 0.05 percent to 3.0 percent of the total composition. Additionally, these compositions may also be prepared by reacting a tertiary nitrogenous mono or polyhydroxy compound with a polyisocyanate or urethane-polyisocyanate containing from two to six isocyanate groups per molecule. This reaction is carried out selecting the reactants and using them in amounts such that the resulting product will contain the OH, NCO, tertiary nitrogen and

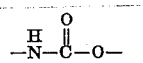

groups in the amounts set forth above.

More specifically, in the practice of the present invention, the proteinaceous materials to be treated are proteinaceous textile materials, and particularly proteinaceous textiles which undergo shrinking during normal laundering operations. These textile materials may be in various forms, including yard goods, as well as various finished articles, such as articles of clothing, including coats, sweaters, socks, shirts, and the like. Of the numerous proteinaceous materials of which such articles may be made, the process of the present invention has been found to be particularly applicable in the treatment of wool. Accordingly, hereinafter, primary reference will be made to wool as being the preferred proteinaceous material. This is not, however, to be taken as a limitation on the present invention as other proteinaceous materials which are subject to shrinkage may also be advantageously treated by the present process, including fabrics made of alpaca, angora, camel hair, cashmere, huarizo, lama, misti, mohair, suri, vicouna, and the like. Additionally, the process of the present invention is not limited to the treatment of wool or other proteinaceous materials in the form of yard goods or finished articles, but may in many instances also be utilized in treating these materials in the fiber or yarn form.

It is to be further appreciated that the proteinaceous materials treated may be admixed with other non-proteinaceous materials as in various fiber blends with synthetics or other natural fiber materials or they may be in the form of a so-called "multi-ply" fibric wherein the proteinaceous fabric is bonded to a fabric of some other material, such as acetate, rayon, nylon, and the like. The treatment of this latter type material has been found to be particularly advantageous in that such materials when treated are found to be substantially wrinkle-free after washing, thereby providing a "wash and wear" wool.

In the preferred method of preparing the above compositions for use in the present wool treating process, a diisocyanate is modified by being reacted with a polyhydroxy material containing from three to six hydroxyl groups, so that the resulting modified diisocyanate contains from about one and one-half to six NCO groups, from 1 percent to 100 percent by weight of the polyhydroxy material used being a tertiary nitrogenous polyhydroxy material. Illustrative of the polyhydroxy compounds containing three to six hydroxyl groups, which are not tertiary nitrogenous polyols with which the diisocyanate may be modified are polyhydric alcohols containing three to six hydroxyl groups, glycerides of hydroxy acids, sugars containing three to six hydroxyl groups and alkyl and aralkyl polyhydroxy acids, ethers, aldehydes and ketones containing three to six hydroxyl groups. These materials may contain one or more dissimilar atoms between carbon atoms, such as oxygen, sulfur, nitrogen and the like, and may be substituted with non-interfering substituents, such as halogens, aryl, including phenyl, naphthyl, and the like. By "non-interfering," it is meant substituents having a reactivity with isocyanates which is less than that of the hydroxy group. Generally, these compounds will contain from about three to about 80 carbon atoms in a straight or branched chain and may be saturated or unsaturated, i.e., contain one or more double or triple bonds.

Exemplary of polyhydric alcohols which may be used are pentaerythritol, dipentaerythritol, trimethylol propane, trimethylol ethane, trimethylol butane, trimethylol isobutane, trimethylol pentane, trimethylol hexane, trimethylol octane, trimethylol nonane, trimethylol undecane, trimethylol heptadecane, trimethylol propene, trimethylol butene, trimethylol pentene, glycerol, sorbitol, butanetriol, 1,2,3,4,5,6-hexanehexol, inositol, trimethylolpropane adipate, mannitol, methyltrimethylolmethane, 1,4,6-octanetriol, 1,2,6-hexanetriol, 1,3,5-hexanetriol, polyallyl alcohol, and the like. Sugars which may be used include tetroses, pentoses, hexoses, heptoses, and the like. Tetroses ($C_4H_8O_4$) include aldoses such as threose and erythrose and ketoses like erythrulose. Pentoses ($C_5H_{10}O_5$) include aldoses and ketoses, such as arabinose, eylose, lyxose, ribose, and arabinulose. Hexoses ($C_6H_{12}O_6$) and heptoses ($C_7H_{14}O_7$) include aldoes and ketoses such as glucose, gulose, tagatose, mannose, galactose, dextrose, talose, allose, idose, altrose, fructose, sorbose, levulose, and mannoheptose. Additionally, disaccharides of bioses trioses and tetroses may also be used.

Exemplary of the glycerides of hydroxy acids, are castor oil (glyceride of ricinoleic acid), as well as the glycerides of such acids as threonic acid, erythronic acid, glycolic acid, lactic acid, hydroxybutyric acid, hydroxyvaleric acid, cerebronic acid, hydroacrylic acid, hydroxycaproic acid, hydroxystearic acid, hydroxydecanoic acid, sabinic acid, juniperic acid, jalapinolic acid, β-hydroxyacrylic acid, α-hydroxyvinylacetic acid, ambrettolic acid, glyceric acid, 3,12-dihydroxypalmitic acid, trihydroxy n-butyric acid, trihydroxyisobutyric acid, aleuritic acid, and the like. As has been noted hereinabove, these glycerides contain three to six hydroxyl groups.

Exemplary of other polyhydroxy compounds which may be used are acids such as trihydroxy n-butyric acid, trihydroxyisobutyric acid, erythronic acid, pentahydroxycaproic acid, threonic acid, aleuritic acid, hexahydroxyheptonic acid, satinic acid, as well as the various aldonic acids including arabonic acid, xylonic acid, sibonic acid, lyxonic acid, gluconic acid, mannonic acid, galactonic acid, gulonic acid, talonic acid, idonic acid, altronic acid, allanic acid, pentahydroxypimelic acid, and the like. Other materials include ethoxylated castor oil, polyoxyalkylene trimethylolpropane, polyoxyalkylene pentaerythritol, polyoxyethylene sorbitan monooleate, polyoxyethylene sorbitan monolaurate, polyoxythylene sorbitan monostearate, polyoxyethylene sorbitan mono-palmitate, sorbitan monostearate, sorbitan monolaurate, sorbitan monooleate, sorbitan monopalmitate, polyoxyethylene sorbitol laurate, polyoxyethylene sorbitol oleate, polyoxyalklene glycerol, sorbitan sesquioleate, populin, picrocrocin, arochloralic acid, streptose, taxicatin, tris(hydroxymethyl)phosphine oxide, tetrakis (hydroxymethyl) phosphonium chloride, and the like. Of all of the above compounds, the preferred are castor oil, polyoxyalkylene derivatives of glycerol and trimethylol propane and hereinafter, primary reference will be made to these materials.

Tertiary nitrogenous polyols which constitute from 1 to 100 percent of the polyhydroxy compounds which are reacted with the diisocyanate material may be any of various tertiary nitrogen-containing compounds which have from 3 to 6 hydroxy groups and may be either alkyl compounds, aryl compounds or mixed alkyl aryl compounds, including heterocyclic polyol compounds containing tertiary nitrogen. Preferably, the tertiary nitrogen polyol used has a molecular weight of greater than about 1,000. Suitable tertiary nitrogenous polyols for use in the present invention are characterized by compounds falling within the following generic formula:

(I) 

(II) 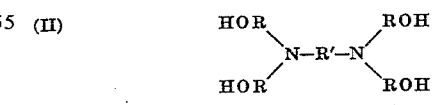

wherein each R is independently selected from the group consisting of alkyl or alkaryl groups containing from one to 22 carbon atoms in a straight, branched or cyclic chain, including groups containing hetero atoms in the chain such as nitrogen, oxygen, sulfur, and phosphorus; and oxyalkylene groups having the formula $(-CH_2CHR''O-)_x$ wherein $R''$ is hydrogen or an alkyl group having one to four carbon atoms and $x$ is a number from 1 to 50, preferably 15 – 30; and $R'$ is an alkyl, aryl or alkaryl group containing two to 18 carbon atoms in a straight branched, or cyclic chain, including a group which contains hetero atoms in the chain including nitrogen, phosphorus, sulfur, and oxygen.

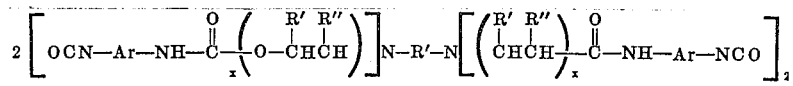

Exemplary of the specific tertiary nitrogenous polyols falling within the above generic formulas which may be used, are triethanolamine; polyoxyethylene ethylene diamine; polyoxypropylene ethylene diamine; mixed polyoxyethylene-propylene ethylene diamine; polyoxyethylene di-ethylene triamine; polyoxypropylene triethylene tetramine; N-methyl-N, N-bis[tris(hydroxymethyl)phenoxymethyl] amine; polyoxyalkylene triethanol amine; N,N dimethyl-N', N'-dihydroxypropyl methylene diamine; N,N-dipropyl-N-2-trihydroxypropoxyethyl amine; polyoxyethylene trihydroxymethyl phosphine oxide; N,N'-tetrahydroxyethyl-o-phenylene diamine; N-trihydroxycyclohexyl-N-ethyl-N'-2-hydroxyethyl-N'-phenyl methylene diamine; N-hydroxyethylphenyl-N,N-dihydroxymethyl amine; polyoxyalkylene-m-hydroxyethyl aniline; low molecular weight phenol-formaldehyde polymer alkylated with dimethylvinyl amine; and the like.

Various organic diisocyanates may be modified by the above polyhydroxy materials. Of the hydrocarbon polyisocyanates, the aryl and alkaryl polyisocyanates of the benzene and naphthalene series are more readily available and less toxic than the aliphatic members. Consequently, the aromatic compound are preferred in the present invention. The preferred compounds which are at present most readily available commercially are 2,4-tolylene diisocyanate, 2,6-tolylene diisocyanate, and mixtures thereof. However, others may be used, among them phenyl diisocyanate; alpha-naphthyl diisocyanate; 4-tolylene diisocyanate; n-hexyl diisocyanate; methylene-bis-(4-phenyl isocyanate); 3,3'-bitolylene-4,4'-diisocyanate; 3,3'-dimethoxy-4,4'-biphenylene diisocyanate; 1,5-naphthalene diisocyanate; 2,4-chlorophenyl diisocyanate; hexamethylene diisocyanate; ethylene diisocyanate; trimethylene diisocyanate; tetramethylene diisocyanate; pentamethylene diisocyanate; decamethylene diisocyanate; 1,3-cyclopentylene diisocyanate; 1,2-cyclohexylene diisocyanate; 1,4-cyclohexylene diisocyanate; cyclopentylidene diisocyanate; cyclohexylidene diisocyanate; p-phenylene diisocyanate; 4,4'-diphenyl methane diisocyanate; 1-methyl-2,4-phenylene diisocyanate; 4,4'diphenylene diisocyanate; 1,2-propylene diisocyanate; 1,2-butylene diisocyanate; 2,3-butylene diisocyanate; 1,3-butylene diisocyanate; ethylidene diisocyanate; propylidene diisocyanate; and butylidene diisocyanate. In addition, isothiocyanates and mixtures of isocyanates may be employed. Also contemplated are the many impure or crude polyisocyanates that are commercially available.

As has been noted hereinabove, the polyol modified isocyanate composition used in the method of the present invention are preferably prepared by reacting one or more of the indicated polyols with a diisocyanate compound, with from 1 to 100 percent of the polyol used being one or more of the tertiary nitrogenous polyols as has been disclosed. In the most preferred embodiment, all of the polyol compound which is reacted with the diisocyanate is a tertiary nitrogenous polyol and preferably a tertiary nitrogenous polyol falling within the generic formula (II) indicated above. Thus, a preferred polyol modified isocyanate composition for use in the present process will have the following generic formula:

where R'', R' and x are as have been defined hereinabove with respect to formula I and II and Ar is benzene, naphthalene, biphenyl or alkyl substituted derivatives of these. In the most preferred embodiment, Ar is methyl phenylene, R' is ethylene x is about 25 and R'' is mixed hydrogen and methyl groups.

As has been noted above, the shrinkproofing composition of the present invention may also be prepared by reacting a mono or polyhydroxy tertiary nitrogenous compound with a polyisocyanate or a urethane-polyisocyanate. In this method, the nitrogenous compound used may contain from one to six OH groups and, preferably has a molecular weight which is not in excess of about 1,000. The polyisocyanates and urethane-polyisocyanates with which the nitrogenous material is reacted contain two to six NCO groups and, include those compounds whose preparation has been set forth above, i.e., which already contain tertiary nitrogen, as well as polyisocyanate and urethane-polyisocyanate compounds, which do not contain tertiary nitrogen, as have been described in co-pending applications Ser. Nos. 510,102 and 510,028, filed Nov. 26, 1965 the latter, now U.S. Pat. No. 3,552,910. Exemplary of compounds of the latter co-pending application are polyisocyanates of the polymethylene, polyphenyl type.

The mono or polyhydroxy tertiary nitrogenous compounds which may be reacted with these isocyanates include those materials containing three to six OH groups, as have been described hereinabove, as well as mono- and di- hydroxy compounds falling within the following generic formula:

(III)

(IV)

and

(V)

wherein R and R' are as have been defined above with respect to formula (I) and (II). Examples of specific compounds which may be used, in addition to those which have been previously set forth are the following:

2-hydroxyethyl dimethylamine; 3-hydroxypropyl diethyl amine; N-2-hydroxyethyl cyclohexylamine; 2-methoxyethyl hydroxypropylethyl amine; N-2'-hydroxyethyl N-methylaniline; N-2-cyanoethyl N-hydroxymethyl p-toluidine polyoxyalkylene-2-hydroxyethyl dimethylamine; 3-hydroxymethylphenyl-dimethylaniline; N-3-thiomethoxypropyl dibutylamine; N,N-di-2-hydroxyethyl methylamine; N-hydroxypropyl N-hydroxyethyl ethylamine; N,N-dihydroxypropyl cyclohexylamine; N-dihydroxypropyl N-methylaniline; ethoxylated N,N-dimethylolalineine; polyoxyalkylene N-methyldiethanolamine; polyoxypropylene benzylamine; N-dihydroxy-cyclohexyl dimethylamine; N-N-dihydroxyethyl p-chloroaniline.

The nitrogen compound and the isocyanate compound will be reacted in amounts such that the resulting compositions contains the specified amount of OH, NCO and

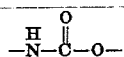

groups and tertiary nitrogen. In many instances, particularly when using the lower molecular weight tertiary nitrogen compounds, it has been found that amounts of these within the range of about 1 to 10 percent by weight of the isocyanate material will produce the desired compositions. In a most preferred embodiment, triethanol amine is reacted with a toluene diisocyanate-castor oil urethane polyisocyanate product, in an amount of about 2.5–5 percent by weight of the toluene diisocyanate-castor oil material.

It must be kept in mind that not only will the amounts of the reactants used depend on the product to be produced, but additionally, the selection of the specific reactants used will also depend on this. Thus, where a mono- or dihydroxy tertiary nitrogen material is used, the isocyanate with which it is reacted will have to contain at least two NCO groups in order that the final product will, itself, contain the requisite minimum of at least one and one-half NCO groups per molecule. Similarly, in this case, the isocyanate material may also have to contain one or more OH groups as well so that the total of OH and NCO groups in the final product meets the required minimum of at least three.

It is to be appreciated that similar compounds, other than those which have been specifically set forth hereinabove, may be utilized as shrinkproofing agents in the process of the present invention. In this regard it is only necessary that the compounds used contain the specified amount of OH, NCO and

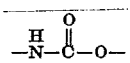

groups and tertiary nitrogen, regardless of the method by which the compound has been prepared. Additionally, the shrinkproofing compositions used may be a mixture of one or more of the above compounds or other similar compounds which fall within the generic formulae which have been given. Often, such mixtures will be the natural result of the preparation of the compositions, which preparations may give a statistical distribution of the possible products.

In preparing the impregnating solutions for use in the method of the present invention, the shrinkproofing component as has been described is dispersed or dissolved in a suitable solvent. Although any solvent, in which the urethane-polyisocyanate material will dissolve without decomposition may be used, in many instances, the aromatic organic solvents, such as benzene, toluene, xylene, and the like, are preferred. Additionally, halogenated aliphatic solvents, such as trichloroethylene, perchloroethylene, carbon tetrachloride, methylene chloride, and the like, have also been found to be extremely useful. The solvents may be classified generally as benzene, substituted benzenes containing one to three lower alkyl groups of one to six carbon atoms each and halogenated lower alkyls containing one to six carbon atoms and one to eight halogens. The shrinkproofing component is dispersed or dissolved in the solvent in an amount sufficient to provide the desired resin add-on on the proteinaceous material when the material is impregnated with the solution. Concentrations within the range of about 0.5 to about 50 percent by weight of the solvent composition are typical, but in many instances, higher concentrations are also suitable, up to the maximum solubility of the urethane-polyisocyanate material in the solvent used. Typical of such higher concentrations which may be used are those of 80 to 90 percent by weight of the solvent composition, or even higher, in those instances where the isocyanate material used is miscible in substantially all proportions with the solvent.

The preparation of the tertiary nitrogen containing urethane-polyisocyanate materials, by the methods set forth above, may be carried out by dissolving the reactants in a suitable solvent, preferably one as has been described above. Typically, the reaction times and temperatures for effecting these reactions are within the range of about 10 minutes to 10 hours at temperatures within the range of about 1°C. to 100°C. Preferably, the times are from about 30 minutes to 5.0 hours at temperatures from 50°C to 80°C. Once the desired product is formed, additional solvent may be added to the reaction mixture to obtain the impregnating solution having the desired concentration. Alternatively, of course, the tertiary nitrogen containing urethane-polyisocyanate may be prepared separately and thereafter dissolved in the solvent in appropriate amounts to form the impregnating solution.

The proteinaceous material, such as a wool textile material, may be impregnated with the polymerizable shrinkproofing solution prepared as indicated hereinabove, using any convenient means. For example, the wool may be immersed or padded in the treating solution and the fabric then passed through squeeze rolls to remove excess solution. If desired, the treating solution may be applied to the material by spraying, rather than by immersion. Other suitable application techniques, as are known to those in the art, may also be used. After the proteinaceous materials have been impregnated with the solution, they are preferably dried so as to remove the solvent from the material. Desirably, the impregnation is carried out so that the treated proteinaceous material has a resin add-on within the range of about 1 percent to about 15 percent by weight of the material. Higher resin add-ons than 15 percent, e.g., 40 to 50 percent, may be attained in some instances although, generally, it has not been found that such higher add-ons appreciably improve the shrink resistance which is obtained. Generally, it has been found that resin add-ons appreciably less than 15 percent, e.g., 0.1 to 5 percent are often sufficient to provide durable shrink-proofing of the proteinaceous materials. Typically, the treating solution is maintained at a temperature within the range of about 10°C. to the boiling point of the solvent used, e.g., 120°C. for perchloroethylene, and preferably is within the range of about 20°C. to about 30°C. during the impregnation step. Thereafter, the impregnated material is dried, preferably in an oven, at a temperature within the range of about 20°C. to the boiling point of the solvent used, temperatures within the range of about 65°C. to about 125°C. being preferred.

Following the impregnation and drying of the proteinaceous material, the thus-treated fabric is then cured with water. Although various techniques may be utilized in effecting this water cure, the treated proteinaceous material is preferably cured in air, by means of the normal moisture in the atmosphere and any moisture remaining in the fabric, and is then immersed in water and maintained in the water until the curing is complete.

It has been found that the time to effect the desired cure of the modified isocyanate material with which the proteinaceous textile is impregnated varies with the temperature at which the cure is effected. Accordingly, it is desirable that the liquid water used is at an elevated temperature, temperatures within the range of about 30°C. to about 100°C. being typical, with temperatures within the range of about 40°C. to about 94°C. being preferred. When carrying out the water cure at these temperatures, curing times within the range of about 1 hour to about 1 minute are typical, with times of 30 minutes to 2 minutes being preferred. It is to be appreciated, that where the length of curing time is not an important factor, the water cure of the modified isocyanate impregnant may be carried out at room temperature, i.e., about 20°C. Under such conditions, the curing time may be as long as several days, e.g., 48 hours. There is, however, some indication that the full shrinkproofing effectiveness of the modified isocyanate compositions may not be attained when the water cure is carried out under these low temperature conditions. Moreover, it has been found that low temperature curing techniques, and particularly those carried out below about 40°C., may not impart to the treated fabric the desired degree of durability to dry cleaning solvents, such as trichloroethylene. In many instances, after curing under these conditions, dry cleaning of the fabric may remove appreciable quantities of the cured shrinkproofing material so that after a subsequent lanudering, shrinkage may occur.

In the most preferred embodiment of the present process, the liquid water cure of the treated material is preceded by a preliminary cure or setting of the impregnant in air, i.e., in the presence only of atmospheric moisture and that which may be retained in the fabric. This procedure is desirably effected at room temperature, i.e., about 20°C., although higher and lower temperatures, as indicated above, may also be used. The length of time for this air cure is generally several hours, e.g., overnight, but is normally carried out to the extent that subsequent wrinkling during the liquid water cure, will not result in permanent setting of the wrinkles in the fabric.

It is to be further appreciated, that if desired, the water cure of the modified isocyanate impregnant may be effected by substantially saturating the impregnated proteinaceous material with water and thereafter, completing the polymerization or cure of the modified isocyanate by heating the water-wet, substantially saturated material at an elevated temperature. In such processes, curing temperatures within the range of about 40°C. to about 177°C. for periods of about 30 minutes to about 1 minute are typical, with temperatures within the range of about 107°C. to about 135°C. for periods of 10 minutes to about 3 minutes being preferred. After the water cure of the impregnated textile material has been completed, the material is then dried to remove any water which may remain. Frequently, where the later described curing process is used, i.e., water impregnation of the treated fabric, followed by heating at an elevated temperature, the curing and drying of the fabric is effected substantially simultaneously.

It has been found that in some instances the water used to carry out the polymerization or cure of the isocyanate impregnant in the textile material is desirably siligntly alkaline. Typical pH values for the curing water are within the range of about 7.5 to 9. Where the pH of the curing water is below these values, it may be adjusted by adding thereto an alkaline material, such as an alkali metal bicarbonate. Additionally, if desired, the curing water may also contain small amounts of a suitable wetting agent, to insure more thorough and rapid wetting of the impregnated material. Typical wetting agents which may be used are nonionics, such as the polyalkylene ethers and anionics, such as alkyl aryl sulfonates and sulfates. These materials are typically present in amounts within the range up to about 1 percent by weight of the treating water, amounts within the range of about 0.05 to about 0.2 percent being preferred. Additionally, it is to be appreciated that the final liquid water cure of the impregnated fabric may be, at least partially, effected during a subsequent fabric treating process which uses a water containing treating solution, as for example, in a dying process.

As has been indicated hereinabove, the process of the present invention may be carried out on proteinaceous materials in various forms, including yard goods, finished articles such as sweaters and the like, as well as, in some cases, on the unspun fiber or the yarn itself. It has been found that proteinaceous textile materials, such as wool, which have been treated in accordance with this process consistently show an area shrinkage of less than about 5 percent, with area shrinkages within the range of about one to three percent being typical. Moreover, it has been found that the shrink resistance is retained by the treated fibric even after numerous washings in hot water and that the hand and feel of the treated materials are not substantially different from those of untreated material. Additionally, the shrinkproof finished is durable to dry cleaning and is found to impart dimensional stability to the fabric. It also facilitates dyeing and improves dye fastness.

In order that those skilled in the art may better understand the present invention and the manner in which it may be practiced, the following specific examples are given. It is to be understood that these examples are illustrative of the invention and are not intended to be limitations thereon. In these examples, unless otherwise indicated, temperatures are in °C., parts and percentages are by weight and shrinkages are given as percent change from an untreated, unwashed control.

EXAMPLE 1

A solution of 17.0 pounds of toluene diisocyanate (commercial mixture of approximately 80 parts of 2,4-toluene diisocyanate and 20 parts of 2,6-toluene diisocyanate) in 147.75 pounds of trichloroethylene was stirred in a 30 gallon stainless steel kettle under a nitrogen atmosphere and heated to 60° to 70°C. To this was added, over about a 30 minute period while maintaining the temperature at about 65°C., 130.75 pounds of a polymeric ditertiary-nitrogen containing tetrol of hydroxyl number (by reaction with toluene diisocyanate) 37.5. This tetrol is a polyalkylene oxide (mixed ethylene propylene oxide) derivative of ethylene diamine, approximate molecular weight 4,000, sold by Wyandotte Chemicals Corporation under the name Tetronic 901. After the addition was complete, the reaction solution was heated for 4 hours at 80°C. and then transferred, under nitrogen, to a 30 gallon drum. The reaction solution analyzed as follows: percent non-volatile, 50.0; percent NCO (by dibutylamine type titration), 1.2; viscosity (25°C), 82.9 centipoise.

EXAMPLE 2

In a three neck flask fitted with mechanical stirrer, thermometer, and dropping funnel, was placed 629 grams of trichloroethylene and 129 of toluene diisocyanate (commercial 80/20 isomer grade). To this was added, under anhydrous conditions and at 60° to 70°C., 500 grams of a ditertiaryamino tetrol of hydroxyl number (by reaction with toluene diisocyanate) 82.6 ± 1.1. This tetrol is a polyalkylene oxide (mixed ethylene-propylene oxide derivative of ethylene diamine, approximate molecular weight 2,750, sold by Wyandotte Chemicals Corporation under the name Tetronic 701. After the addition was complete, the reaction solution was heated for four hours at 80°C. Analysis of an aliquot indicated the presence of 2.69% NCO. The viscosity at 25°C. was 42.85 centistokes.

EXAMPLE 3

A pad bath containing 3.5 percent solids was prepared by diluting the reaction product described in Example 1 with trichloroethylene as follows:

polyurethane-isocyanate (50 percent solids) — 350 lbs.
Trichloroethylene — 4620 lbs.

Woolen flannel, 8,400 yards, was impregnated with the above bath and squeezed to 135 percent wet pick-up. The fibric was dried on steam heated cans, and flat folded for storage. The fabric was charged to standard dye kettles the following day, water cured at 30° to 55°C. for 20 minutes, then dyed in the normal manner using acid premetallized dyes. The material was then scutched, and dried in a tenter frame dryer. Finishing steps included shearing, decating and inspecting. The fabric has a soft hand, changed but very slightly from the untreated fabric, and the dyeing was completely level and the shades matched the standards.

Samples were taken from each 1,200 yards for laundering tests, shown below:

| Sample No. | Shrinkage After 10 Automatic Home Washer | |
|---|---|---|
| | Fill | Warp |
| 1-A | 0.0 | 0.3 |
| 1-B | 2.0 | 1.7 |
| 2 | 0.8 | 0.7 |
| 3 | 2.0 | 1.7 |
| 4 | 2.4 | 2.0 |
| 5 | 0.8 | 2.7 |
| 6 | 1.2 | 1.7 |

EXAMPLE 4

Polyurethane containing free isocyanate groups was prepared from one mole of castor oil and three moles of toluene diisocyanate as described in application Ser. No. 510,102. To 20 grams of this product in 980 grams of trichloroethylene was added 0.5 grams of triethanol amine, this quantity of polyhydroxy tertiary amine being equivalent to 25 mole percent of the methane polyisocyanate. Reaction is nearly instantaneous. Wool flannel was padded with the above solution at a wet pick-up of about 160 percent based on dry weight of wool, and dried for 2 minutes at 122°C. One half of the sample was cured in water for 10 minutes in a wrinkled configuration (simulating a dye beck) at 60°C., the other half was not water cured. Both samples were then subjected to repetitive automatic home launderings at 60°C.

| Sample | A | B |
|---|---|---|
| Water Cure 10"/140°F | No | Yes |
| Area Shrinkage, % | | |
| 5 cycles | 15.1 | 0.7 |
| 10 cycles | 29.3 | 1.9 |
| 30 cycles | – | 4.3 |

Sample B evidenced excellent resistance to felting and the fabric was free of wrinkles, even though cured in water in a wrinkled condition.

A sample of wool treated with the above composition, but omitting the nitrogenous hydroxy compound, and cured in a manner similar to that used for Sample B, evidenced similar felting resistance but was badly creased, the wrinkles being evident even after 30 launderings.

EXAMPLE 5

A large scale experiment was conducted in a commercial mill as follows:

PAD BATH

Reaction product of castor oil (1 mol) and toluene diisocyanate
(3 moles) (50 percent in trichloroethylene — 19 lbs.

Trichloroethylene — 408 lbs.
Triethanol amine — 0.032 lbs.

These chemicals were charged in the order listed. Wool flannel, 400 yards, were processed through the impregnating bath and squeezed to 135 percent wet pick-up. The fabric was then dried on dye cans to remove solvent and flat folded. The following day, the treated fabric was charged to a standard dye beck, cured by means of water containing 2 percent soda ash and 0.1 percent of a nonionic wetting agent, raising the temperatures of the water from 30°C. to 60°C. in 10 minutes, and holding this temperature for 20 minutes. The fabric was then rinsed and dyed using an acid premettalized dye at the boil for 1 hour. The dyed fabric was then cooled, scutched, dried, sheared and decated. The treated fabric evidenced no felting or shrinkage through 20 automatic home washes.

EXAMPLE 6

A portion of the urethane-polyisocyanate composition of Example 2, was diluted with trichloroethylene to form a treating solution containing 1.75 percent by weight of the urethane-polyisocyanate. A swatch of plaid woolen fabric was padded through the solution, squeezed between rubber rolls to obtain a 200 percent by weight wet pick-up, and was then air dried. The impregnated fabric was cured over night in air and then by immersion in water for 20 minutes, the water containing about 0.1 percent of a nonionic wetting agent. The water, initially, was at 26°C. and was raised to a final temperature of 49°C. during the time of immersion. The cloth was rinsed pressed dry and then equilibrated to the room conditions. It was then subjected to 10 wash cycles in an automatic home washer: 4 pound load, one cup of detergent, cold water level and 10 minute wash cycle at 41°C. After drying and equilibrating, it was found that the area shrinkage was less than 5 percent.

EXAMPLE 7

The fabric treating procedure of Examples 3 – 6 is repeated with treating solutions prepared by using the hydroxyl containing tertiary amine compounds and polyisocyanates in the amounts shown in the following table. In each instance, the reaction times and temperature and add-ons are varied as necessary to obtain the indicated reaction product. With all of these treating solutions, the wool treated has an area shrinkage of less than about 6 percent.

| Example | Hydroxyl containing t-amine | Polyisocyanate | Moles Polyisocyanate per mole hydroxy containing t-amine | Moles Free NCO per mole of t-N containing polyisocyanate |
|---|---|---|---|---|
| A | Polyoxyalkylene ethylene diamine | 2,6-Toluene diisocyanate | 4 | 4 |
| B | Polyoxypropylene diethylene triamine | Methylene bis-(4-phenyl diisocyanate) | 5 | 5 |
| C | Polyoxyethylene triethanolamine | Hexamethylene diisocyanate | 3 | 3 |
| D | N-methyl diethanolamine | Polymethylene polyphenyl isocyanate | 2 | 4 |
| E | Triethanolamine | Product of Sample A | 1 | 3 |
| F | N,N'-bis(2-hydroxyethyl ethyl anolamine | Condensate castor oil with 3 moles of toluene diisocyanate | 2 or 1 | 4 or 2 |
| G | Triethanolamine | Condensate castor oil with 3 moles of toluene diisocyanate | 3, 2 or 1 | 6, 4 or 2 |
| H | Tetrahydroxyethyl ethylene diamine | Condensate of ethoxylated trimethylolphenol with 4 moles toluene diisocyanate | 4 | 4 |
| i | 2-hydroxyethyl N,N-dimethylamine | Condensate of poly(oxyalkylated) pentaerythritol with 4 moles of ethylene diisocyanate | 1 | 3 |
| J | Polyoxypropylene triethanolamine | 2,4-toluene diisocyanate | 2 | 2 |
| K | Triethanolamine | Condensate of polyoxypropylene trihydroxymethyl phosphine oxide with 3 moles methylene bis-(4-phenyldiisocyanate) | 3 | 3 |

While there have been described various embodiments of the invention, the compositions and methods described are not intended to be understood as limiting the scope of the invention as changes therewithin are possible and it is intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method of shrinkproofing a proteinaceous textile material which comprises:
    a. contacting said proteinaceous textile material with a non-aqueous treating solution consisting essentially of a non-aqueous solvent and a urethane-polyisocyanate containing $(OH)_n$, $(NCO)_p$, $$\left(-\overset{O}{\underset{|}{N}}-\overset{\|}{C}-\right)_q$$

and tertiary nitrogen groups, wherein $n$ is a number from 0 to 4.5, $p$ is a number from 1.5 to 6, $q$ is a number from 1 to 20 and $n + p$ is a number from 3 to 6, said urethane-polyisocyanate having been prepared by reacting (a) an excess of a monomeric diisocyanate with a polyol which contains three to six hydroxyl groups and tertiary nitrogen groups and which is a polyalkylene oxide derivative of a monomeric lower alkylene polyamine, or (b) an excess of an isocyanate-terminated pre-polymer with a tertiary nitrogen-containing monomer having from three to six hydroxyl groups and no polyoxy alkylene groups, said pre-polymer having been prepared by reacting an excess of a monomeric diisocyanate with a polyol containing from three to six hydroxyl groups; said tertiary nitrogen groups being present in said urethanepolyurethane in an amount of at least about 0.05 percent by weight, and (b) curing the thus-contacted proteinaceous textile material with water at a temperature of from about 20°C. to about 100°C.

2. The method as claimed in claim 1 wherein the urethane-poly-isocyanate is the reaction product of a polyhydroxy compound containing m hydroxyl groups, and a diisocyanate, which reactants are in a ratio of 1 mole of polyhydroxy compound to $m - n$ mole of diisocyanate, wherein $m$ is a number from 3 to 6, $n$ is a number from 0 to 4.5 and $m - n$ is at least 1.5, and wherein from about 1 to 100 percent of the polyhydroxy compound reacted is a polyhydroxy tertiary nitrogenous compound.

3. The method as claimed in claim 2 wherein the urethane-poly-isocyanate in the treating solution is an isocyanate having the formula:

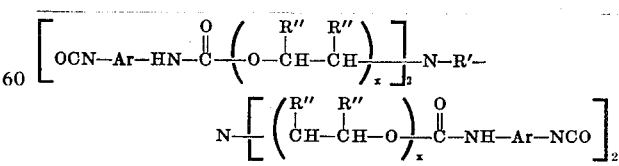

wherein each R'' is independently selected from the group consisting of hydrogen and alkyl groups containing from one to four carbon atoms, $x$ is a number from 1 to 50 and R' is selected from the group consisting of
    a. alkyl groups
    b. aryl groups c. alkaryl groups
d. hetero-containing alkyl groups wherein the hetero atoms are selected from the group consisting of nitrogen, phosphorus, sulfur and oxygen.
e. hetero-containing aryl groups wherein the hetero atoms are selected from the group consisting of nitrogen, phosphorus, sulfur and oxygen, and
f. hetero-containing alkaryl groups wherein the hetero atoms are selected from the group consisting of nitrogen, phosphorus, sulfur and oxygen; the groups defined (a) through (f) containing from two to 18 carbon atoms in a straight, branched or cyclic chain.

4. The method as claimed in claim 1 wherein the urethane-poly-isocyanate is formed by reacting a tertiary nitrogenous hydroxy compound containing from one to six hydroxyl groups with an isocyanate material selected from the group consisting of polyisocyanates and urethane-poly-isocyanates containing from two to six isocyanate groups.

5. The method as claimed in claim 4 wherein the nitrogenous compound is triethand amine and the isocyanate material is the reaction product of toluene diisocyanate and castor oil.

6. The method as claimed in claim 2 wherein the urethane-poly-isocyanate is contained in the treating solution in an amount within the range of from about 1 percent to about 50 percent by weight of the solution.

7. The method as claimed in claim 2 wherein the impregnated proteinaceous textile material is pre-cured in air, in exposure to atmospheric moisture and the final cure is effected by immersing the impregnated proteinaceous textile material in water at a temperature of from about 30°C. to about 100°C. for a period of from about 1 hour to about 1 minute.

8. The method as claimed in claim 1 wherein the polyhydroxy tertiary nitrogenous compound is selected from the group consisting of

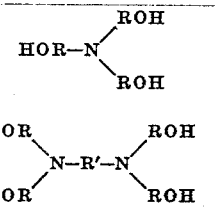

wherein each R is independently selected from the group consisting of substituted or unsubstituted alkyl or alkaryl groups containing from one to 22 carbon atoms and R' is a divalent substituted or unsubstituted alkyl, aryl or alkaryl group containing from two to 18 carbon atoms.

9. The method as claimed in claim 1 wherein the pH of the water employed as the curing agent is from about 7.5 to about 9.

10. A proteinaceous textile material prepared in accordance with the process of claim 1.

* * * * *